United States Patent
Springberg

(10) Patent No.: US 11,960,735 B2
(45) Date of Patent: Apr. 16, 2024

(54) MEMORY CHANNEL CONTROLLER OPERATION BASED ON DATA TYPES

(71) Applicant: Micron Technology, Inc., Boise, ID (US)

(72) Inventor: David G. Springberg, Fort Collins, CO (US)

(73) Assignee: Micron Technology, Inc., Boise, ID (US)

( * ) Notice: Subject to any disclaimer, the term of this patent is extended or adjusted under 35 U.S.C. 154(b) by 294 days.

(21) Appl. No.: 17/464,576

(22) Filed: Sep. 1, 2021

(65) Prior Publication Data
US 2023/0060322 A1     Mar. 2, 2023

(51) Int. Cl.
*G06F 3/06*     (2006.01)

(52) U.S. Cl.
CPC .......... *G06F 3/0622* (2013.01); *G06F 3/0604* (2013.01); *G06F 3/0631* (2013.01); *G06F 3/0659* (2013.01); *G06F 3/0679* (2013.01)

(58) Field of Classification Search
USPC ........................................................ 711/163
See application file for complete search history.

(56) References Cited

U.S. PATENT DOCUMENTS

| | | | | |
|---|---|---|---|---|
| 5,867,642 A * | 2/1999 | Vivio | ..................... | G11C 29/74 714/6.13 |
| 6,934,820 B2 | 8/2005 | Chauvel et al. | | |
| 10,983,933 B2 * | 4/2021 | Ware | ..................... | G11C 7/106 |
| 11,500,577 B2 * | 11/2022 | Gong | ..................... | G06F 3/0679 |
| 2008/0126691 A1 * | 5/2008 | Yang | ..................... | G06F 13/1684 711/105 |
| 2009/0055572 A1 * | 2/2009 | Askar | ................. | G06F 13/1684 711/E12.001 |
| 2012/0198292 A1 * | 8/2012 | Yuzurihara | ............ | G11C 29/56 714/E11.159 |
| 2013/0332681 A1 * | 12/2013 | Miller | ................... | G06F 3/0659 711/154 |
| 2019/0347204 A1 * | 11/2019 | Du | ......................... | G06F 3/0688 |
| 2020/0042225 A1 * | 2/2020 | Oh | ......................... | G06F 3/061 |
| 2020/0057578 A1 | 2/2020 | Benisty et al. | | |
| 2021/0173589 A1 * | 6/2021 | Benisty | ................. | G06F 3/0604 |
| 2021/0200689 A1 | 7/2021 | Benisty et al. | | |
| 2021/0232338 A1 * | 7/2021 | Benisty | ................. | G06F 3/0664 |

* cited by examiner

*Primary Examiner* — Reginald G Bragdon
*Assistant Examiner* — Aaron D Ho
(74) *Attorney, Agent, or Firm* — Brooks, Cameron & Huebsch, PLLC

(57) ABSTRACT

The present disclosure includes systems, apparatuses, and methods related to memory channel controller operation. For example, a data type associated with an access request may be determined. The access request may be executed by utilizing, responsive to determining the access request is associated with a first data type, a first memory channel controller coupled to a first memory device to access a first memory address range, associated with the first data type, allocated to the first memory device. The access request may be executed by utilizing, responsive to determining the access request is associated with a second data type, the first memory channel controller and a second memory channel controller coupled to a second memory device to access a second memory address range, associated with the second data type, allocated among the first memory device and the second memory device.

19 Claims, 6 Drawing Sheets

US 11,960,735 B2

MEMORY CHANNEL CONTROLLER OPERATION BASED ON DATA TYPES

TECHNICAL FIELD

The present disclosure relates generally to memory devices, and more particularly, to methods, systems, and apparatuses for memory channel controller operation.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), three-dimensional cross-point memory (e.g., 3D XPoint™), resistive random access memory (RRAM), ferroelectric random access memory (FeRAM), magnetoresistive random access memory (MRAM), and programmable conductive memory, among other types of memory.

DETAILED DESCRIPTION

Figure 1:
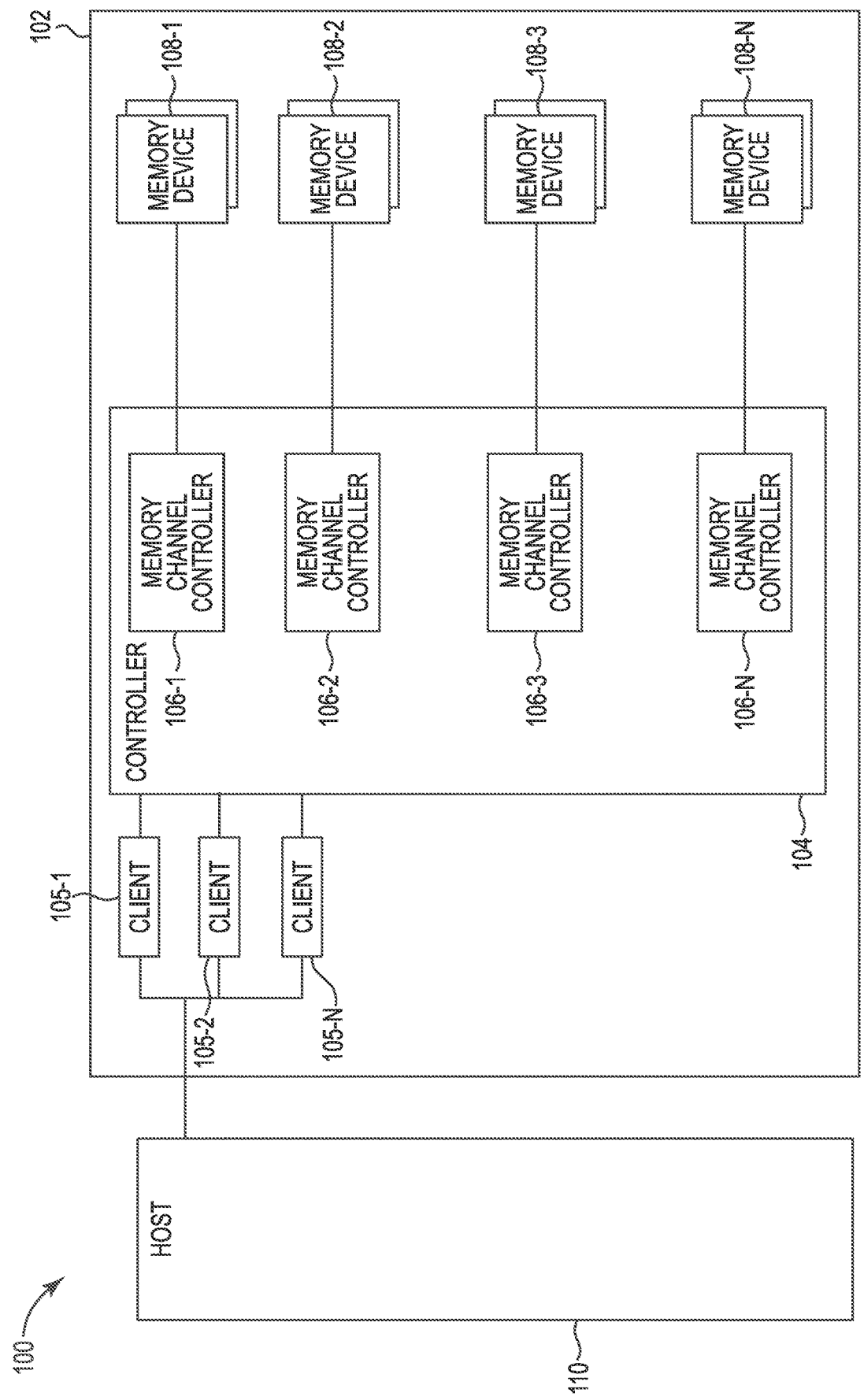
FIG. 1 is a block diagram of an apparatus in the form of a computing system including a memory system in accordance with embodiments of the present disclosure.

Various embodiments of the present disclosure describe methods, systems, and apparatuses for memory channel controller operation. A number of embodiments can provide improved performance (e.g., reduced latency) and/or power savings by providing multiple channel controllers that can be operated independently or in parallel depending on the type of access request (e.g., from a client).

For example, memory systems may include a controller communicatively coupled to a plurality of memory devices. Each of the memory devices may include a bank of memory cells storing data values. The controller may receive access requests from a communicatively coupled host to access the data values in the memory cells. The controller may translate the access request to a command to be transmitted to and performed by the plurality of communicatively coupled memory devices. The controller may communicate the command and its response over a memory bus. The memory bus may have a width corresponding to a quantity of data which can be communicated over across the memory bus during a single beat, or increment of a clock cycle, timing and/or synchronizing the transmission of data across the bus. For example, a beat may correspond to a clock cycle increment during which an amount of data equal to the width of the memory bus may be transmitted between the controller and the memory devices. In some examples, the memory bus may be 64-bits wide, meaning that during a single beat a maximum of 64 bits of data may be transmitted between the controller and the memory devices. In some examples, the memory bus may be made up of a plurality of distinct channels running between the controller and the memory devices. For example, the memory bus may include four 16-bit wide channels collectively forming a 64-bit wide memory bus interface.

In some examples, the controller and memory devices may communicate over the memory bus over a burst of beats. A burst may include a plurality of beats during which data is communicated. For example, a response to a command may include 128 bytes of data. The 128 bytes of data may be transmitted over the memory bus to the controller over a burst of sixteen beats, each beat including a transmission of 64 bits (or 8 bytes) of data being transmitted at a time.

However, the execution of some access requests may involve the communication of an amount of data less than the width of the memory bus over the burst duration. In an example, an access request may be a relatively shorter access which may include a request to access data in an amount that would only consume a portion of the width of the memory bus over the duration of the burst. For example, the access request may be direct to accessing 5 bytes of data in a firmware table stored on the memory device. In such examples, presently the entire width of the memory bus is dedicated to providing the data over the entire burst length despite only needing a portion to complete the transfer.

In contrast, various embodiments of the present disclosure may channelize data storage and access among a plurality of memory devices in a memory system. For example, embodiments may split data and its access across a plurality of memory devices accessible across a plurality of respective channels by a plurality of respective memory controllers. With the channelized data storage and access embodiments described herein, less than the full capacity of the memory bus may be utilized in transmitting data and/or multiple access requests may be executed in parallel to utilize any remaining capacity. In addition to other improvements, latency may be reduced by executing multiple shorter access requests in parallel and power consumption may be reduced by only utilizing a minimum number of channels to execute an access request.

As used herein, "a", "an", or "a number of" can refer to one or more of something, and "a plurality of" can refer to two or more such things. For example, a memory device can refer to one or more memory devices, and a plurality of memory devices can refer to two or more memory devices.

The figures herein follow a numbering convention in which the first digit or digits correspond to the drawing figure number and the remaining digits identify an element or component in the drawing. Similar elements or components between different figures may be identified by the use of similar digits.

FIG. 1 is a block diagram of an apparatus in the form of a computing system 100 including a memory system 102 in accordance with embodiments of the present disclosure. As used herein, a memory system 102 may include a controller 104, a plurality of memory channel controllers 106-1 . . . 106-N, and a plurality of memory devices 108-1 . . . 108-N. As used herein, a memory system 102, controller 104, plurality of memory channel controllers 106-1 . . . 106-N, and/or plurality of memory devices 108-1 . . . 108-N might also be separately considered an "apparatus."

The computing system 100 includes a host 110 communicatively coupled (e.g., connected, etc.) to the memory system 102. The host can be a host system such as a personal laptop computer, a desktop computer, a digital camera, a smart phone, a memory card reader, and/or internet-of-thing enabled device, among various other types of hosts. Host 110 can include a system motherboard and/or backplane and can include a number of processing resources (e.g., one or more processors, microprocessors, or some other type of controlling circuitry). The computing system 100 can include separate integrated circuits or both the host 110 and the memory device 120 can be on the same integrated circuit.

In some examples, the host 110 may be communicatively coupled with the memory system 102 and/or communicate with the memory system via a host bus, which may be referred to as a system bus. The host may generate access requests to access data stored on the memory system 102. Although a single host 110 is shown in FIG. 1, embodiments are not so limited. For example, multiple hosts can be coupled to the memory system 102 with each host capable of making client requests (e.g., access requests) to the controller 104 over a respective system bus. Additionally, the host 110 can invoke one or more of multiple different clients 105-1 . . . 105-N associated with various data types included in and/or requested by access requests. In some examples, more than one host may be communicatively coupled to and/or accessing the data of the memory system 102. Each host 110 may include hardware, a user profile, and/or a set of instructions (e.g., applications, programs, etc.) that, as part of their operation and/or execution, rely on sending a client request (e.g., access requests) to another set of hardware and/or instructions (e.g., memory system 102, etc.) for access to data, services, functionality, etc. provided from the another set of hardware and/or instructions in reply to the client request.

A client 105-1 . . . 105-N may be associated with accessing a specific type of data. For example, a first client may be associated with accessing control memory buffer (CMB) type data stored in the memory devices 108-1 . . . 108-N. A second client may be associated with accessing persistent memory buffer (PMR) type data stored in the memory devices 108-1 . . . 108-N. A third client may be associated with accessing logical to physical table (L2P) type data stored in the memory devices 108-1 . . . 108-N. CMB, PMR, and L2P data are some non-limiting examples of data types associated with respective distinct clients 105-1 . . . 105-N. The clients 105-1 . . . 105-N may be resident and/or executable within the memory device 102, resident and/or executable within the controller 104, and/or resident and/or executable within the host 110.

The memory system 102 may include a plurality of memory devices 108-1 . . . 108-N (referred to collectively as memory devices 108). Each of the plurality of memory devices 108-1 . . . 108-N may be a single memory device or a plurality of memory devices. A memory device may be a memory die that includes a memory array. For example, the memory device can include an array or multiple arrays of memory cells arranged in multiple rows and columns of storage units and be located on a single chip or spread across multiple chips of the memory device. The memory devices 108 may be DRAM devices; however, embodiments are not so limited. For example, the memory devices can include ferroelectric random access memory (FeRAM) devices among various other types of volatile or non-volatile memory devices.

In some embodiments, each memory device can be addressed separately, for example, by a controller and/or memory channel controller as described in greater detail below. Each memory device may include a system processor to control and/or orchestrate performance of memory operations and/or a bank processor to perform memory operations in response to instructions received from the system processor.

Data may be stored in the memory cells of the memory devices 108-1 . . . 108-N. A host 110 may transmit an access request to the memory system 102 in order to access the data stored in the memory cells of the memory device 108-1 . . . 108-N.

The memory system 102 includes a controller 104. The controller 104 may include hardware and/or instructions to decode the access requests provided from the host 110. These signals can include chip enable signals, write enable signals, and/or address latch signals that can be used to control operations performed on the memory array of the memory devices 108-1 . . . 108-N, including data sense, data store, data movement (e.g., copying, transferring, and/or transporting data values), data write, and/or data erase operations, among other operations. In various embodiments, the controller 104 can be responsible for orchestrating the execution of instructions from the host 110 and the accessing of data on the memory devices 108-1 . . . 108-N utilizing the memory channel controllers 106-1 . . . 106-N. The controller 104 can be a state machine, a sequencer, or some other type of controller. In some examples, the controller 104 and/or its instructions may be referred to as a memory manager component of the memory system 102.

The memory system 102 includes a plurality of memory channel controllers 106-1 . . . 106-N. The memory channel controllers 106-1 . . . 106-N can be a state machine, a sequencer, or some other type of controller. Each of the plurality of memory channel controllers 106-1 . . . 106-N may be configured to execute instructions from the host 110 with respect to a respective corresponding portion of the plurality of memory devices 108-1 . . . 108-N. For example, a first memory channel controller 106-1 may be responsible for accessing data of a first number of memory devices 108-1 associated with a first channel, a second memory channel controller 106-2 may be responsible for accessing data of a second number of memory devices 108-2 associated with a second channel, and so on and so forth.

As such, each of the plurality of memory channel controllers 106-1 . . . 106-N may include and/or utilize a physical interface or memory bus communicatively coupling the memory channel with a corresponding respective portion of the plurality of memory devices 108-1 . . . 108-N. For example, the first memory channel controller 106-1 may share a physical memory bus interface with a first memory device 108-1, the second memory channel controller 106-2 may share a physical memory bus interface with the second memory device 108-2, and so on.

The interface between the memory devices 108-1 . . . 108-N and their respective and corresponding memory channel controllers 106-1 . . . 106-N may have a data width corresponding to a quantity of data which can be communicated over across the memory bus during a single beat, or increment of a clock cycle, timing and/or synchronizing the transmission of data across the bus. The total width of the memory bus interface between all the memory devices 108-1 . . . 108-N and all of their respective and corresponding memory channel controllers 106-1 . . . 106-N may be a maximum total width of the memory bus interface that may be realized when operating all the memory channel controllers 106-1 . . . 106-N simultaneously. For example, a maximum total width of the memory bus interface that may be realized when operating all the memory channel controllers 106-1 . . . 106-N simultaneously may be 64 bits of data. Accordingly, where there are only two memory channel controllers on a memory system then the memory bus width between the first memory channel controller and its corresponding memory device may be 32 bits and the memory bus width between a second memory channel controller and its corresponding memory device may be 32 bits as well. Extending the example to memory systems having four memory channel controllers, each memory bus interface between each of the four memory channel controllers and their respective corresponding memory device may be 16 bits. These non-limiting examples serve to illustrate ways in which the maximum total width of the memory bus interface may be divided among whatever amount of memory channel controllers included in a memory system.

The memory channel controllers 108-1 . . . 108-N may be operated independently and/or simultaneously (e.g., in parallel) providing different widths of data transmission capacity. For example, a first memory channel controller 106-1 may be utilized independently of the other memory channel controllers 106-2 . . . 106-N of the plurality of memory channel controllers 106-1 . . . 106-N thereby providing a data per-beat transmission width corresponding to the memory bus width dedicated to the first memory channel controller 106-1. Alternatively, a first memory channel controller 106-1 and a second memory channel controller 106-2 may be utilized simultaneously, thereby providing a per-beat data transmission width corresponding to the memory bus width dedicated to the first memory channel controller 106-1 in addition to the memory bus width dedicated to the second memory channel controller 106-2.

For example, if each of four memory channel controllers of the plurality of memory channel controllers 106-1 . . . 106-N communicated with its respective corresponding memory device 108-1 . . . 108-N via a 16 bit per-beat wide memory bus interface then independently operating a single memory channel controller would provide 16 bit per-beat data transmission capacity, simultaneously operating two of the memory channel controllers would provide a total of 32 bits per-beat data transmission capacity, simultaneously operating three of the memory channel controllers would provide a total of 48 bits per-beat data transmission capacity, and/or simultaneously operating four of the memory channel controllers would provide a total of 64 bits per-beat data transmission capacity.

By channelizing the data transmission between the memory channel controllers 106-1 . . . 106-N and the memory devices 108-1 . . . 108-N in this manner, the memory system 102 is able to scale the portion of the total width of memory bus data transmission being utilized to execute an access request. In some examples, smaller access requests that may not require the total width of a memory bus across all memory channel controllers 106-1 . . . 106-N over the entire burst length to fully execute may be executed utilizing only a portion of the total width of a memory bus across all memory channel controllers 106-1 . . . 106-N over the entire burst length needed to fully execute.

As such, the additional capacity (e.g., the unused portion of the total width of the memory bus across all of the memory channel controllers 106-1 . . . 106-N) of the total width of a memory bus across all memory channel controllers 106-1 . . . 106-N may be freed up. The freed up additional capacity may be unused, thereby reducing the power and bandwidth consumption for an access request execution. That is, by only keeping a minimum number of memory bus channels active between the memory channel controllers 106-1 . . . 106-N communicating with their respective memory devices 108-1 . . . 108-N necessary to execute an access request, an energy savings may be realized. Additionally, a read-modify-write reduction may be realized and a shorter burst may be utilized on fewer channels than a full burst which may allow for the utilization of a shorter error correction code (ECC) codeword.

Moreover, the additional capacity may be utilized in the simultaneous execution of other access requests. For example, the freed up capacity may be utilized to simultaneously execute another smaller access requests that may not require the total width of a memory bus across all memory channel controllers 106-1 . . . 106-N over the entire burst length to fully execute. By simultaneously executing a plurality of access requests that previously would have been executed serially in a manner that would have wastefully involved the total width of a memory bus across all memory channel controllers 106-1 . . . 106-N for the burst despite not utilizing that full capacity, a reduction in latency may be realized without increasing an I/O switching rate for the memory system 102. In fact, in some examples, the I/O switching rate for the memory system 102 may be reduced in light of the reduced power, ECC, and latency demands on the system, which may drive further power savings.

Channelizing access to the memory devices 108-1 . . . 108-N as described herein may have the effect of limiting the data locations that can be accessed by a particular memory channel controller 106-1 . . . 106-N. For example, a first memory channel controller 106-1 may have access to only the memory cells of the corresponding first memory device 108-1 with which it shares its portion of the physical memory bus interface. That is, the first memory channel controller 106-1 may only be able to cause the successful execution of an access request and/or a portion of an access request that involves accessing data stored in the first memory device 108-1 to which the first memory channel controller 106-1 is communicatively coupled. Likewise, a second memory channel controller 106-2 may only be able to cause the successful execution of an access request and/or a portion of an access request that involves accessing data stored in the second memory device 108-2, a third memory channel controller 106-3 may only be able to cause the successful execution of an access request and/or a portion of an access request that involves accessing data stored in the third memory device 108-3, a fourth memory channel controller 106-4 may only be able to cause the successful execution of an access request and/or a portion of an access request that involves accessing data stored in the fourth memory device 108-4, etc.

As such, the way data is saved among the memory devices 108-1 . . . 108-N may be structured, as described in greater detail below, in a manner that allows various types of access requests to be fully executed in a manner that may keep a minimum number of memory bus channels active between the memory channel controllers 106-1 . . . 106-N communicating with their respective memory devices 108-1 . . . 108-N and/or allows for simultaneous execution of different access requests and/or access request portions. For example, data may be stored according to its type. For example, data may be stored according to the amount of data transmission capacity involved in fully executing an access request involving the type of the data. That is, data may be stored based on the size (e.g., amount of data transmission capacity) of a burst associated with execution of an access request directed to that type of data. In some examples, the controller 104 may be responsible for directing the storage of data according to this scheme.

For example, data of a first type may be data associated with relatively smaller burst sizes to execute a corresponding access request. For example, data of the first type may be data associated with a first type of access request which can be fully executed utilizing only a portion of the memory channel controllers 106-1 . . . 106-N. In some examples, data of the first type may be data associated with a first type of access request which can be fully executed utilizing only a single memory channel controller of the plurality of memory channel controllers 106-1 . . . 106-N. For example, data of the first type may be data associated with a first type of access request which can be fully executed utilizing only a portion of the full memory bus width that is allocated to a single memory channel controller of the plurality of memory channel controllers 106-1 . . . 106-N. For example, data of the first type may be data associated with a first type of access request which can be fully executed utilizing 4 Bytes of memory bus transmission capacity. As such, an access request associated with data of the first type may be fully executed utilizing a single memory channel controller having 16 bits of memory bus transmission capacity, which, over 16 beats of a burst, would accommodate 32 bytes of data transmission capacity. For example, data of the first type may be logical to physical table (L2P) data. For example, data of the first type may include data associated with and/or responsive to an execution of an L2P access request.

Data of a second type may be data associated with a relatively moderate burst size (e.g., larger than data of the first type and smaller than data of a third type) to execute a corresponding access request. For example, data of the second type may be data associated with a second type of access request which can be fully executed utilizing a portion of the memory channel controllers 106-1 . . . 106-N greater than the first type and less than a third type). In some examples, data of the second type may be data associated with a second type of access request which can be fully executed by simultaneously utilizing two memory channel controllers of the plurality of memory channel controllers 106-1 . . . 106-N. For example, data of the second type may be data associated with a second type of access request which can be fully executed utilizing a portion of the full memory bus width that is allocated among two memory channel controllers of the plurality of memory channel controllers 106-1 . . . 106-N. For example, data of the second type may be data associated with a second type of access request which can be fully executed utilizing two memory channel controllers each having 16 bits of memory bus transmission capacity, which, over 16 beats of a burst, would accommodate 64 bytes of data transmission capacity. For example, data of the second type may be persistent memory buffer (PMR) data. For example, data of the second type may include data associated with and/or responsive to an execution of a PMR access request.

Data of a third type may be data associated with a relatively large burst size (e.g., larger than data of the first type and larger than data of the second type) to execute a corresponding access request. For example, data of the third type may be data associated with a third type of access request which can be fully executed utilizing a portion of the memory channel controllers 106-1 . . . 106-N greater than the first type and greater than the second type). In some examples, data of the third type may be data associated with a third type of access request which can be fully executed by simultaneously utilizing four memory channel controllers of the plurality of memory channel controllers 106-1 . . . 106-N. For example, data of the third type may be data associated with a third type of access request which can be fully executed utilizing the full memory bus width that is allocated among four memory channel controllers of the plurality of memory channel controllers 106-1 . . . 106-N. For example, data of the third type may be data associated with a third type of access request which can be fully executed utilizing four memory channel controllers each having 16 bits of memory bus transmission capacity, which, over 16 beats of a burst, would accommodate 128 bytes of data transmission capacity. For example, data of the third type may be control memory buffer (CMB) data. For example, data of the third type may include data associated with and/or responsive to an execution of a CMB access request.

As such, the controller 104 may cause data values of the first data type to be stored in memory address ranges of the memory devices 108-1 . . . 108-N such that data of the first type is divided substantially equally among the data channels (e.g., a data channel being a memory channel controller and its corresponding respective memory device) of the memory system 102. For example, the data values of the first data type may be spread among all of the data channels of the memory system 102 such that each access request of the first data type may be executed utilizing a single channel and such that sequential access requests of data of the first type may be executed in parallel utilizing a respective data channel to execute each of the sequential access requests simultaneously. That is, data of the first type may be stored in address ranges spread among the plurality of memory devices 108-1 . . . 108-N such that multiple access requests involving the first type of data may be executed simultaneously by simultaneously utilizing a distinct memory channel to execute each access request.

Likewise, the controller 104 may cause data values of the second data type to be stored in memory address ranges of the memory devices 108-1 . . . 108-N such that data of the second type is divided substantially equally among portions of the data channels of the memory system 102. For example, the data values of the second data type may be spread among two sets of the data channels of the memory system 102 such that each access request of the second data type may be executed utilizing a plurality of data channels making up less than the entire amount of data channels of the memory system 102. Data of the second data type may, for example, be spread among sets of data channels such that sequential access requests of data of the second type may be executed in parallel utilizing a respective set of data channels to execute each of the sequential access requests simultaneously. That is, data of the second type may be stored in address ranges spread among the plurality of memory devices 108-1 . . . 108-N such that multiple access requests involving the second type of data may be executed simultaneously by simultaneously utilizing distinct groups of memory channels to execute each access request. For example, if the memory system 102 included four data channels, access requests whose execution involves accessing data of the second type may be executed utilizing two of the four data channels. As such, two of the access requests whose execution involves accessing data of the second type may be simultaneously executed utilizing two of the four data channels for each of the access requests.

The controller 104 may cause data values of a third data type to be stored in memory address ranges of the memory devices 108-1 . . . 108-N such that data of the third type is divided substantially equally among all the data channels of the memory system 102. For example, the data values of the third data type may be spread among each of the data channels of the memory system 102 such that each access request of the third data type may be executed utilizing all of the data channels making the entire amount of data channels of the memory system 102. In such examples, since access requests involving data of the third type may involve utilizing the full memory channel capacity of the memory system 102, simultaneous execution of multiple access requests involving data of the third type may not be accommodated by the memory system 102.

Therefore, the controller 104 may queue up the access requests for execution according to the data storage structure and memory channel arrangement of the memory system 102. For example, the controller 104 may organize access requests in an execution queue of each memory channel controller 106-1 . . . 106-N according to the access request's data type and/or the address ranges that the involved data values are stored within.

For example, the controller 104 may queue an access request associated with a first data type for execution in an execution queue of a first memory channel controller 106-1 when the requested data is saved in an address range corresponding to the corresponding first memory device 108-1. The controller may queue an access request associated with a first data type for execution in an execution queue of a second memory channel controller 106-2 when the requested data is saved in an address range corresponding to the corresponding second memory device 108-2. The controller may queue an access request associated with a first data type for execution in an execution queue of a third memory channel controller 106-3 when the requested data is saved in an address range corresponding to the corresponding third memory device 108-3. The controller may queue an access request associated with a first data type for execution in an execution queue of a fourth memory channel controller 106-N when the requested data is saved in an address range corresponding to the corresponding fourth memory device 108-N. The controller 104 may examine the access request to determine its address range. The controller 104 may determine that each of a plurality of access requests associated with a first data type request access to different address ranges corresponding to different memory devices accessed utilizing different memory channel controllers. In such examples, the controller 104 may queue the plurality of access requests associated with a first data type for simultaneous execution via each of their corresponding memory channels. Alternatively, the controller 104 may determine that each of a plurality of access requests associated with a first data type request access to a same address range and/or a same corresponding memory device accessed utilizing the same memory channel controller. In such examples, the controller 104 may delay or otherwise modify the order of the access requests in an execution queue to prevent simultaneous execution of access requests which involve conflicting memory channel access.

The controller 104 may queue an access request associated with a second data type for execution in an execution queue of a first set of memory channel controllers (e.g., first memory channel controller 106-1 and second memory channel controller 106-2) when the requested data is saved in an address range corresponding to the corresponding first memory device 108-1 and second memory device 108-2 and/or in an execution queue of a second set of memory channel controllers (e.g., third memory channel controller 106-3 and fourth memory channel controller 106-N) when the requested data is saved in an address range corresponding to the corresponding third memory device 108-3 and fourth memory device 108-N. The controller 104 may examine the access request to determine its address range. The controller 104 may determine that each of a plurality of access requests associated with a second data type request access to different address ranges corresponding to different ones of the first and second sets of memory channels associated with executing access requests of the second data type. In such examples, the controller 104 may queue the plurality of access requests associated with the second data type for simultaneous execution via each of their corresponding sets of memory channels (e.g., a first access request executed by a first set of memory channels including the first memory channel controller 106-1, the first memory device 108-1, the second memory channel controller 106-2, and the second memory device 108-2 and a second access request executed by a second set of memory channels including the third memory channel controller 106-3, the third memory device 108-3, the fourth memory channel controller 106-N, and the fourth memory device 108-N). Alternatively, the controller 104 may determine that each of a plurality of access requests associated with the second data type request access to a same address range and/or a same corresponding memory channel. In such examples, the controller 104 may delay or otherwise modify the order of the access requests in an execution queue to prevent simultaneous execution of access requests which involve conflicting memory channel set access.

The controller 104 may queue various combinations of access requests of different data types for simultaneous execution, as well. A non-limiting example may include the controller 104 may queue a first access request of a first data type for execution by a first memory channel (e.g., memory channel controller 106-1 and memory device 108-1), a second access request of the first data type for simultaneous execution with the first access request by a second memory channel (e.g., memory channel controller 106-2 and memory device 108-2), and a third access request of the second data type for simultaneous execution with the first and second access request by a third set of memory channels (e.g., memory channel controllers 106-3 and 106-N and memory channel devices 108-3 . . . 108-N) where corresponding memory address ranges allow.

The controller 104 may queue an access request associated with the third data type for execution in an execution queue of all of the memory channel controllers 106-1 . . . 106-N. That is, since an access request associated with the third data type may utilize the entire width of the memory bus to successfully execute during a burst, all of the memory channels may need to be simultaneously utilized in order to execute the access request. Access requests of the first and second data types may not be simultaneously executed while an access request of the third data type is being executed as an access request of the third data type consumes the entire bandwidth of the memory bus across all the memory channel controllers 106-1 . . . 106-N during a burst.

The controller 104 may queue access requests for execution additionally based on priorities associated with the access requests. For example, the controller 104 may queue access requests such that access requests associated with data having a relatively higher priority assigned thereto may be executed before access requests associated with data having a relatively lower priority assigned thereto. Additionally, the controller 104 may queue access requests such that access requests received from a host 110 having a relatively higher priority assigned thereto may be executed before access requests received from a host having a relatively lower priority assigned thereto.

In an example, an operation of the computing system 100 may include a transmission of an access request from a host 110 to the memory system 102 over a host bus. The access request may be received by the controller 104. The controller may analyze the access request to identify various characteristics of the access request to be utilized in queuing the access request for execution.

For example, the controller 104 may determine a priority of the host 110 associated with the access request. The controller 104 may determine a data type associated with the access request. In some examples, the controller 104 may determine the data type associated with the access request based on a size of a burst associated with an execution of the access request. For example, the controller 104 may determine the data type associated with the access request based on a minimum size of a burst sufficient to fully execute the access request, which may be based on the quantity of data to be accessed and/or transmitted across the memory bus to execute the access request. The controller 104 may also determine a priority associated with the data type associated with the access request. The controller 104 may determine memory address ranges of the data sought to be accessed by the access request.

The controller 104 may queue the access request such that, responsive to determining that the access request is associated with a first type of data, the access request is executed utilizing a first memory channel controller coupled to a first memory device in order to access a first memory address range, associated with the first data type, allocated to the first memory device.

The controller 104 may queue the access request such that, responsive to determining that the access request is associated with a second type of data, the access request is executed utilizing the first memory channel controller and a second memory channel controller coupled to a second memory device to access a second memory address range, associated with the second data type, allocated among the first memory device and the second memory device.

The controller 104 may queue the access request such that, responsive to determining that the access request is associated with a third type of data, the access request is executed utilizing the first memory channel controller, the second memory channel controller, and a third memory channel controller coupled to a third memory channel device to access a second memory address range, associated with the third data type, allocated among the first memory device, the second memory device, and the third memory device.

The controller 104 may queue the access request and another access request such that the access request and the another access request are executed simultaneously in parallel. That is the access request may be queued such that it is executed as a first portion of a burst and the another access request may be queued such that it is simultaneously executed as a second portion of the same burst. For example, as described above access requests associated with different data types may require different amounts of memory bus capacity in order to fully execute within a burst of, for example, sixteen beats of a clock cycle. In some examples, less than the full capacity of the memory bus capacity may be utilized to fully execute some access requests. In the above example, where the access request and the another access request may both be executed within the same burst by simultaneously utilizing respective portions of the memory bus capacity split among the above described memory channels, the controller 104 may queue these access requests for simultaneous execution during a same burst utilizing distinct memory channels. For example, the access request may be executed as a first portion of a burst made up of the data transmission capacity of a first memory channel controller or controllers during a burst and the another access request may be executed as a second portion of the burst made up of the data transmission capacity of a second memory channel controller or controllers during the same burst.

However, the controller 104 may queue access requests that would utilize less than the full capacity of the memory bus capacity to fully execute when those access requests have conflicting memory address ranges. For example, if the access request and the another access request could simultaneously within the full capacity of the memory bus capacity split among the memory channels, but their address ranges map to a same or conflicting memory channel (e.g., both involve access data values in a memory address range mapping to a same memory device or set of memory devices) then the controller 104 may queue one of the access requests to be executed later than the other. In some examples, the first access request to be executed among conflicting access requests may be determined based on an associated priority assignment (e.g., to the source host, to the data type, etc.).

Figure 2:
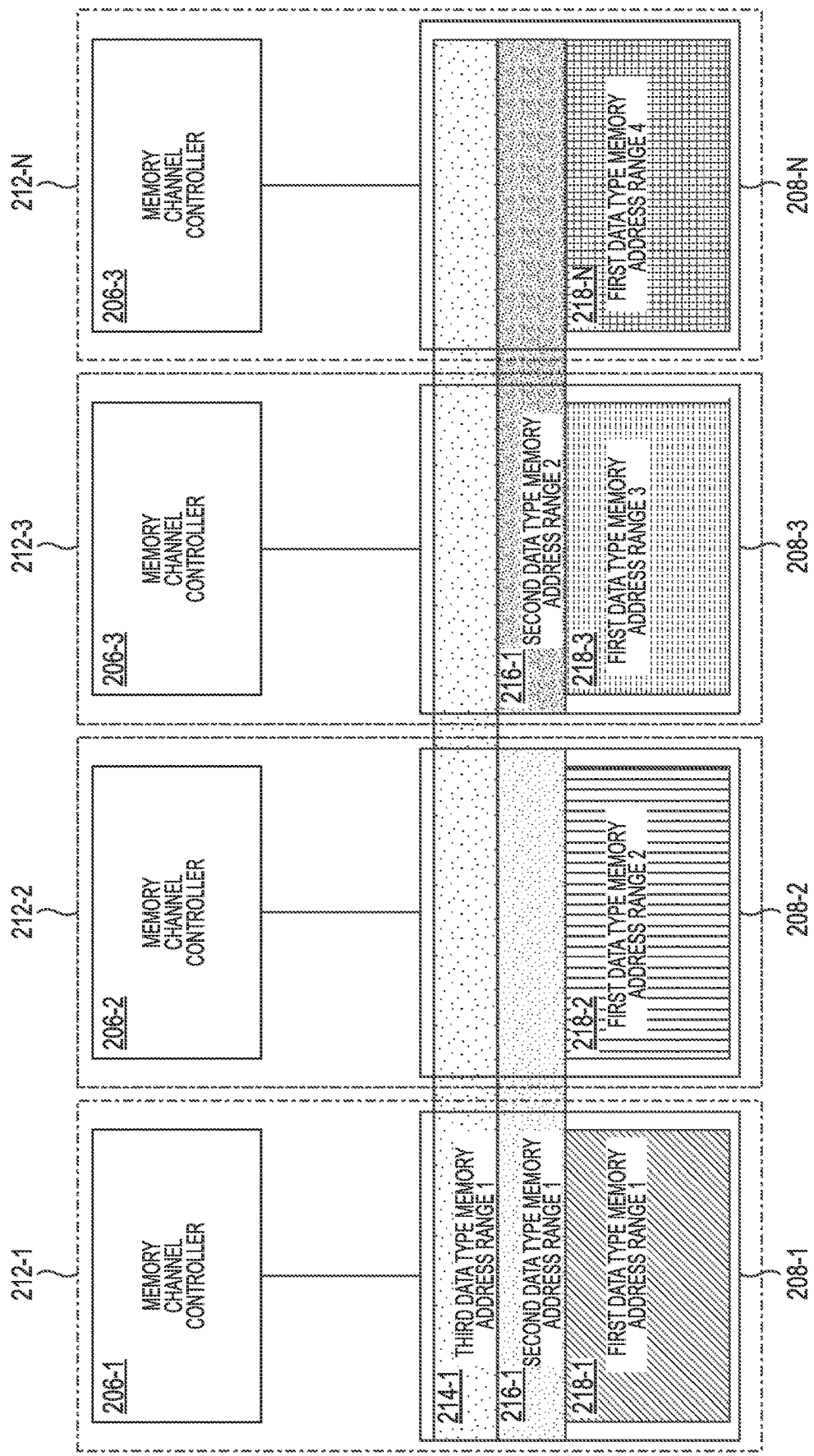
FIG. 2 is a block diagram of memory channels within a memory system in accordance with embodiments of the present disclosure.

FIG. 2 is a block diagram of memory channels 212-1 . . . 212-N within a memory system in accordance with embodiments of the present disclosure. In some examples, the memory system may be similar to memory system 102 in FIG. 1.

Each memory channel 212-1 . . . 212-N includes a memory channel controller 206-1 . . . 206-N and a corresponding memory device 208-1 . . . 208-N. The memory devices 208-1 . . . 208-N may include DRAM memory devices. The memory devices 208-1 . . . 208-N may represent the DRAM storage capacity of the memory system. Data values for the memory system may be stored in the memory devices 208-1 . . . 208-N. The memory channel controllers 206-1 . . . 206-N may include individual controllers, each individual controller communicatively coupled to their respective memory devices 208-1 . . . 208-N.

A single memory channel of the plurality of memory channels 212-1 . . . 212-N may be operated independently of the other channels. For example, a first memory channel 212-1 may be operated independently of the second, third, and fourth memory channels 212-2 . . . 212-N. That is, the first memory channel 212-1 may be utilized to execute a separate access request from the second, third, and fourth memory channels 212-2 . . . 212-N during a same burst. As such, the first memory channel controller 206-1 may be operated independently of the second, third, and fourth memory channel controllers 206-2 . . . 206-N. For example, the first memory channel controller 206-1 may execute an access request during a burst while the second, third, and/or fourth memory channel controllers 206-2 . . . 206-N may independently execute different access requests during the burst.

Additionally, sets of the plurality of memory channels 212-1 . . . 212-N may be operated independently of other sets of the memory channels. For example, a first set of memory channels including the first memory channel 212-1 and the second memory channel 212-2 may be operated independently of a second set of memory channels including the third memory channel 212-3 and the fourth memory channel 212-N during a burst. That is, the first memory channel controller 206-1 and the second memory channel controller 206-2 may be operated cooperatively as a set during a burst to execute an access request, while the third memory channel controller 206-3 and the fourth memory channel controller 206-N may be operated cooperatively as a set during the burst to execute a different access request independent of the first and second memory channel controller 206-1 and 206-2.

Further, the plurality of memory channels 212-1 . . . 212-N may be operated cooperatively. That is, the first memory channel 212-1, the second memory channel 212-2, the third memory channel 212-3, and the fourth memory channel 212-N may be utilized in parallel to cooperatively execute an access request during a burst. As such, the first memory channel controller 206-1, the second memory channel controller 206-2, the third memory channel controller 206-3, and the fourth memory channel controller 206-N may be operated in parallel to cooperatively execute an access request during a burst.

Each of the memory devices 208-1 . . . 208-N may include one or more than one memory device. Each of the memory devices 208-1 . . . 208-N may store data values in memory cells located within memory arrays. The data values may be stored in memory cells identified by and/or addressable by memory address ranges. Specific memory address ranges may be allocated to specific memory devices 208-1 . . . 208-N. As such, specific memory address ranges may be allocated to specific memory channels 212-1 . . . 212-N.

In some examples, specific memory address ranges may be reserved for data of a specific type. That is, specific memory address ranges may be designated to store specific types of data. As such, specific types of data may be stored in specific memory channels 212-1 . . . 212-N at specific memory devices 208-1 . . . 208-N. As described above, power consumption, ECC codeword length, and latency reductions may be achieved by channelizing the data in a manner that allows for selective memory channel 212-1 . . . 212-N activation and parallel execution of access requests utilizing independent operation of memory channels 212-1 . . . 212-N and/or sets thereof.

As described above, different types of data associated with an access request may be categorized based on a minimum amount of data transmission capacity consumed in fully executing the access request. For example, a first data type may include a short access data type which may be executed utilizing a minimum of a single memory channel 212-1 over a burst. A second data type may include an intermediate access data type which may be executed utilizing a minimum of pair of memory channels 212-1 and 212-2 cooperatively over the burst. A third data type may include a long access which may be executed utilizing a minimum of all four memory channels 212-1 . . . 212-N cooperatively over the burst.

As such, data of the first type, the second type, and the third type may be spread among the memory channels 212-1 . . . 212-N accordingly. In some examples, the data may be spread vertically among the memory channels 212-1 . . . 212-N.

For example, a plurality of memory address ranges may be reserved for data of a first data type. For example, a plurality of memory address ranges including a first memory address range 218-1, a second memory address range 218-2, a third memory address range 218-3, and/or a fourth memory address range 218-4 may be reserved from a first type of data. The plurality of first data type memory address ranges 218-1 . . . 218-4 may be respectively allocated vertically among the first memory device 208-1 of the first memory channel 212-1, the second memory device 208-2 of the second memory channel 212-2, the third memory device 208-3 of the third memory channel 212-3, and the fourth memory device 208-N of the fourth memory channel 212-N. Vertical storage may refer to spreading the first data type memory address ranges 218-1 . . . 218-4 in substantially equal portions among the four memory channels 212-1 . . . 212-N in a manner that allows each portion of the first data type memory address ranges 218-1 . . . 218-4 to be independently accessed to execute corresponding access requests over their corresponding memory channel controller 206-1 . . . 206-N. For example, if data of the first type makes up 7,760 MB of data, then the first data type memory address ranges 218-1 . . . 218-N may be divided into four 1,940 MB portions of the first data type, with each equal portion being allocated to a separate memory channel having a separate and independently operable memory channel controller and memory device. As such, each portion of the plurality of first data type memory address ranges 218-1 . . . 218-4 may be individually and separately accessed by its corresponding memory channel controller 206-1 . . . 206-N to execute an access request associated with the first data type. Further, each portion of the plurality of first data type memory address ranges 218-1 . . . 218-4 may be individually and separately accessed by its corresponding memory channel controller 206-1 . . . 206-N simultaneously to simultaneously execute a plurality of access request associated with the first data type so long as those plurality of access requests fall within distinct portions of the memory address ranges located in distinct memory channels.

That is, data of the first data type may be stored across four distinct address ranges (e.g., 218-1, 218-, 218-3, and 218-4) and each of the address ranges may be confined within a respective memory channel (e.g., 212-1, 212-2, 212-3, and 212-N). The four distinct address ranges (e.g., 218-1, 218-, 218-3, and 218-4) may be treated distinctly for the purposes of accessing data stored therein. For example, access requests regarding data stored in the first data range 218-1, access requests regarding data stored in the second data range 218-2, access requests regarding data stored in the third data range 218-3, and/or access requests regarding data stored in the fourth data range 218-N may be executed independently and simultaneously via their respective memory channel controllers (206-1, 206-2, 206-3, and 206-N) as though each memory channel 212-1 . . . 212-N is an independently addressable and separate memory system despite being logical segmentations of a same memory system that are independently addressable by respective memory channel controllers.

In some examples, the data may be spread vertically and horizontally among the memory channels 212-1 . . . 212-N. For example, a plurality of memory address ranges may be reserved for data of a second data type. For example, a plurality of memory address ranges including a first memory address range 216-1 and a second memory address range 216-2 may be reserved from a second type of data. The plurality of second data type memory address ranges 216-1 . . . 216-2 may be respectively allocated vertically among a pair of two of the four memory channels 212-1 . . . 212-N. In some examples, data of the second type may include 32 MB of data. The 32 MB of data may be spread into equal 8 MB chunks of data spread among the four memory channels 212-1 . . . 212-N both vertically and horizontally. The plurality of second data type memory address ranges 216-1 . . . 216-2 may be allocated vertically among two sets of memory channels (e.g., a first vertical set including memory channel 212-1 and memory channel 212-2 and a second vertical set including memory channel 212-3 and memory channel 212-N). As such, the plurality of second data type memory address ranges 216-1 . . . 216-2 may be allocated among two vertical sets. The first vertical set may include the second data type memory address range 216-1 spread horizontally across memory channel 212-1 and memory channel 212-3. The second vertical set may include the second data type memory address range 216-2 spread horizontally across memory channel 212-1 and memory channel 212-3. Again, vertical storage may refer to each vertical set including data of the second type being stored in substantially equally portions among the vertical sets of memory channels in a manner that allows each vertical set to be independently accessed to execute corresponding independent access requests over their corresponding memory channel controllers. The horizontal storage of data of the second type across memory channels of the vertical sets may refer to the data of the second type within a vertical set being stored in substantially equal portions across both of the memory channels making up the vertical set in a manner that allows both of the portions within a vertical set to be cooperatively accessed by their respective memory channel controller to cooperatively execute a same access request. For example, data in the memory channel 212-1 of the second data type memory address range 216-1 may be accessed by the memory channel controller 206-1 along with data in the memory channel 212-2 the second data type memory address range 216-1 being accessed by the memory channel controller 206-2 in order to cooperatively execute an access request. Likewise, data in the memory channel 212-3 of the second data type memory address range 216-2 may be accessed by the memory channel controller 206-3 along with data in the memory channel 212-N of the second data type memory address range 216-2 being accessed by the memory channel controller 206-N in order to cooperatively execute an access request. Additionally, the second data type memory address range 216-1 of the first vertical memory channel set (212-1 and 212-2) and the second data type memory address range 216-2 of the second vertical memory channel set (212-3 and 212-N) may be simultaneously and independently accessed in order to execute a plurality of distinct access request associated with the second data type so long as those plurality of access requests fall within distinct portions of the memory address ranges located in distinct memory channel vertical sets.

That is, data of the second data type may be stored across two distinct address ranges (e.g., 216-1 and 216-2) and each of the address ranges may be confined within a respective set of memory channels (e.g., a first set 212-1 and 212-2, and a second set 212-3 and 212-N). The two distinct address ranges (e.g., 216-1 and 216-N) may be treated distinctly for the purposes of accessing data stored therein. For example, access requests regarding data stored in the first data range 216-1 and/or access requests regarding data stored in the second data range 216-2 may be executed independently and simultaneously via their respective sets of memory channel controllers (e.g., first set 206-1 and 206-2, second set 206-3 and 206-N) as though each set of memory channels (e.g., first set 212-1 and 212-2, second set 212-3 and 212-N) is an independently addressable and separate memory system despite being logical segmentations of a same memory system that are independently addressable by their respective memory channel controller sets.

A memory address range may be reserved for data of a third data type. For example, a single memory address range such as memory address range 214-1 may be reserved for data of a third data type. In some examples, data of the third type may include 400 MB of data. The 400 MB of data may be spread into equal 100 MB chunks of data spread across the four memory channels 212-1 . . . 212-N horizontally. As such, data of the third data type may be equally allocated within the third data type memory address range 214-1 spanning among the four memory channels 212-1 . . . 212-N in a manner that allows all of the data of the third type stored within the third data type memory address range 214-1 spread among all four memory channels 212-1 . . . 212-N to be cooperatively accessed by their respective memory channel controller to cooperatively execute a same access request. For example, data of the third data type stored within the first channel 212-1 within the third data type memory address range 214-1 may be accessed by the memory channel controller 206-1, along with data of the third data type stored within the second channel 212-2 within the third data type memory address range 214-1 may be accessed by the memory channel controller 206-2, along with data of the third data type stored within the third channel 212-1 within the third data type memory address range 214-1 may be accessed by the memory channel controller 206-3, along with data of the third data type stored within the fourth channel 212-N within the third data type memory address range 214-1 may be accessed by the memory channel controller 206-N in order to cooperatively execute an access request directed to data of the third type which may be stored in and/or across one or more of the channels making up the third data type memory address range 214-1.

That is, data of the third type may be stored across a single address range which spans across all the plurality of memory channels 212-1 . . . 212-N falling within the third data type memory address range 214-1. When an access request is received requesting access to data of the third data type, all four memory channel controllers 206-1 . . . 206-N may be cooperatively operated in order to cooperatively provide access to the requested data which may be located in and/or across one or more of the channels making up the third data type memory address range 214-1.

To summarize, the memory system of FIG. 2 includes a first memory controller 206-1 coupled to a first memory device 208-1. A first memory address range 218-1 reserved for a first portion of a first data type (e.g., the data values of the first data type vertically saved and mapped to the first data type memory address range 218-1 of the first memory device 208-1) is allocated to the first memory device 208-1. That is, the first portion of the first data type is the data saved vertically in the first data type memory address range 218-1 of the first memory device 208-1, while the second portion of the first data type would be the data saved vertically in the first data type memory address range 218-2 of the second memory device 208-2, the third portion of the first data type would be the data saved vertically in the first data type memory address range 218-3 of the third memory device 208-3 (e.g., the sixth memory address range), and the fourth portion of the first data type would be the data saved vertically in the first data type memory address range 218-N of the fourth memory device 208-N(e.g., the seventh memory address range).

Additionally, the memory system includes a second memory controller 206-2 coupled to a second memory device 208-2. A second memory address range 216-1 is reserved for a first portion of a second data type (e.g., the data values of the second data type vertically saved and mapped within the second memory address range 216-1 within the first memory channel 212-1 in the first memory device 208-1 and within the second memory channel 212-2 in the second memory device 208-2) is allocated among the first memory device 208-1 and the second memory device 208-N. The memory system also includes a third memory address range 218-2 reserved for a second portion of the first data type (e.g., the data values of the first data type vertically saved and mapped to the first data type memory address range 218-2 of the second memory device 208-2) that is allocated to the second memory device 208-2. That is, the first portion of the second data type is the data saved in the second data type memory address range 216-1 spread across the first memory device 208-1 and the second memory device 208-2, while the second portion of the second data type would be the data saved in the second data type memory address range 216-2 spread across the third memory device 208-3 and the fourth memory device 208-N(e.g., the fifth memory address range).

Further, the memory system includes a third memory controller 206-3 coupled to a third memory device 208-3 and a fourth memory controller 206-N coupled to a fourth memory device 208-N. A fourth memory address range 214-1 is reserved for a third data type and is allocated among the first memory device 208-1, the second memory device 208-2, the third memory device 208-3, and the fourth memory device 208-N.

Although not illustrated in FIG. 2, the memory system may include a memory manager. As described with respect to FIG. 1, a memory manager may include a controller (e.g., controller 104) and/or instructions executable by a controller to execute access requests consistent with embodiments of the present disclosure. The memory manager may, for example, determine a memory address range associated with a first access request and determine a memory address range associated with a second access request. The memory manager may utilize the first memory channel controller 206-1 and the second memory channel controller 206-2 to execute the first access request responsive to a determination that the first access request is associated with the second memory address range 216-1. Alternatively, the memory manager may utilize the first memory controller 206-1 to execute the first access request responsive to a determination that the first access request is associated with the first memory address range 218-1. Alternatively, the memory manager may utilize the second memory 206-2 controller to execute the second access request in parallel with an execution of the first access request utilizing the first memory controller 206-1, responsive to a determination that the first access request is associated with the first memory address range 218-1 and a determination that the second access request is associated with the third memory address range 218-2.

In some examples, the first data type may include L2P Table data, the second data type may include PMR data, and the third data type may include CMB data. Moreover, the memory manager may be configured to assign and/or modify execution priorities of each access request based on these data types. For example, the memory manager may assign a higher execution priority in the access request execution queue to controller memory buffer (CMB) access requests and persistent memory region (PMR) accesses requests than an execution priority assigned to a logical to physical (L2P) accesses requests.

Figure 3:
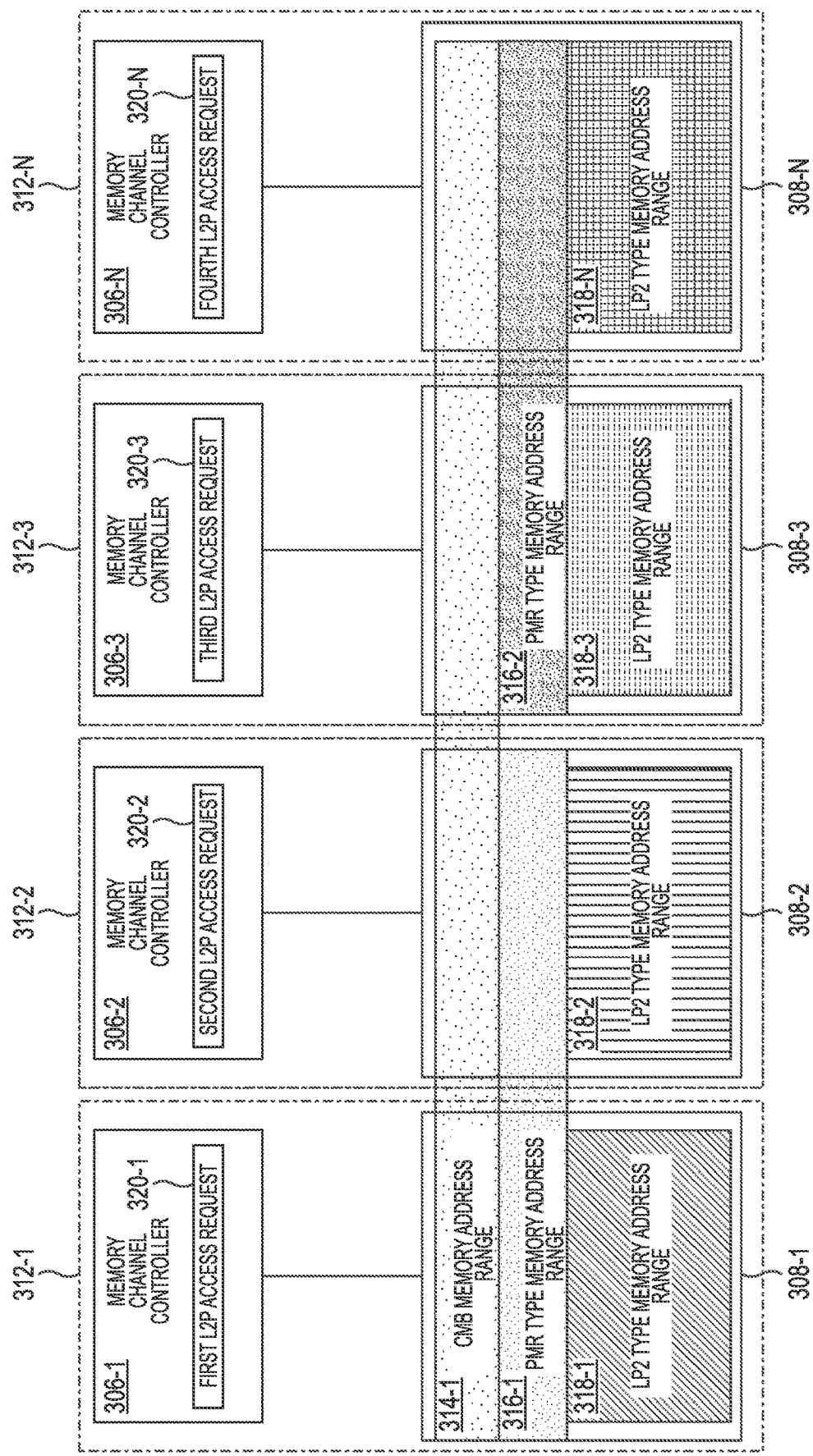
FIG. 3 is a block diagram of executing a plurality of L2P access requests utilizing a plurality of memory channels within a memory system in accordance with embodiments of the present disclosure.

FIG. 3 is a block diagram of executing a plurality of L2P access requests 320-1 . . . 320-N utilizing a plurality of memory channels 312-1 . . . 312-N within a memory system in accordance with embodiments of the present disclosure.

In FIG. 3 a memory manager or controller of the memory system may receive a plurality of access requests 320-1 . . . 320-N from a communicatively coupled host. The memory manager may determine a client and/or data type associated with each of the plurality of access requests 320-1 . . . 320-N. That is, the memory manager may determine a type of data being requested by each access request. In the example illustrated in FIG. 3, the memory manager may determine that the plurality of access requests is a plurality of L2P access requests 320-1 . . . 320-N. An L2P access request may be executed utilizing one of four eight-bit wide memory channels.

The memory manager may queue the plurality of L2P access requests 320-1 . . . 320-N for execution by the plurality of memory channels 312-1 . . . 312-N of the memory system. The memory manager may determine whether any of the plurality of L2P access requests 320-1 . . . 320-N are attempting to access L2P data entries in a same memory channel 312-1 . . . 312-N. If the memory manager determines that any of the plurality of L2P access requests 320-1 . . . 320-N are attempting to access L2P data entries in a same memory channel 312-1 . . . 312-N, then the memory manager may selectively delay the execution of some of the L2P access requests in order to eliminate any conflict. However, when the memory manager determines that none of the plurality of L2P access requests 320-1 . . . 320-N are attempting to access L2P data entries in a same memory channel 312-1 . . . 312-N, the memory manager may queue each of the plurality of L2P access requests 320-1 . . . 320-N in a separate memory channel 312-1 . . . 312-N for a simultaneous execution of the plurality of L2P access requests 320-1 . . . 320-N in parallel during the same burst.

For example, the memory manager may cause the first memory channel controller 306-1 to execute the first L2P access request 320-1 by accessing requested L2P data in an L2P type memory address range 318-1 in the first memory device 308-1. The memory manager may cause the second memory channel controller 306-2 to execute the second L2P access request 320-2 by accessing requested L2P data in an L2P type memory address range 318-2 in the second memory device 308-2 simultaneous with the execution of the first L2P access request 320-1. The memory manager may cause the third memory channel controller 306-3 to execute the third L2P access request 320-3 by accessing requested L2P data in L2P memory address range 318-3 in the third memory device 308-N simultaneous with the execution of the first L2P access request 320-1 and the second L2P access request 320-3. The memory manager may cause the fourth memory channel controller 306-N to execute the fourth L2P access request 320-N by accessing requested L2P data in L2P memory address range 318-N in the fourth memory device 308-N simultaneous with the execution of the first L2P access request 320-1, the second L2P access request 320-2, and the third L2P access request 320-3.

Figure 4:
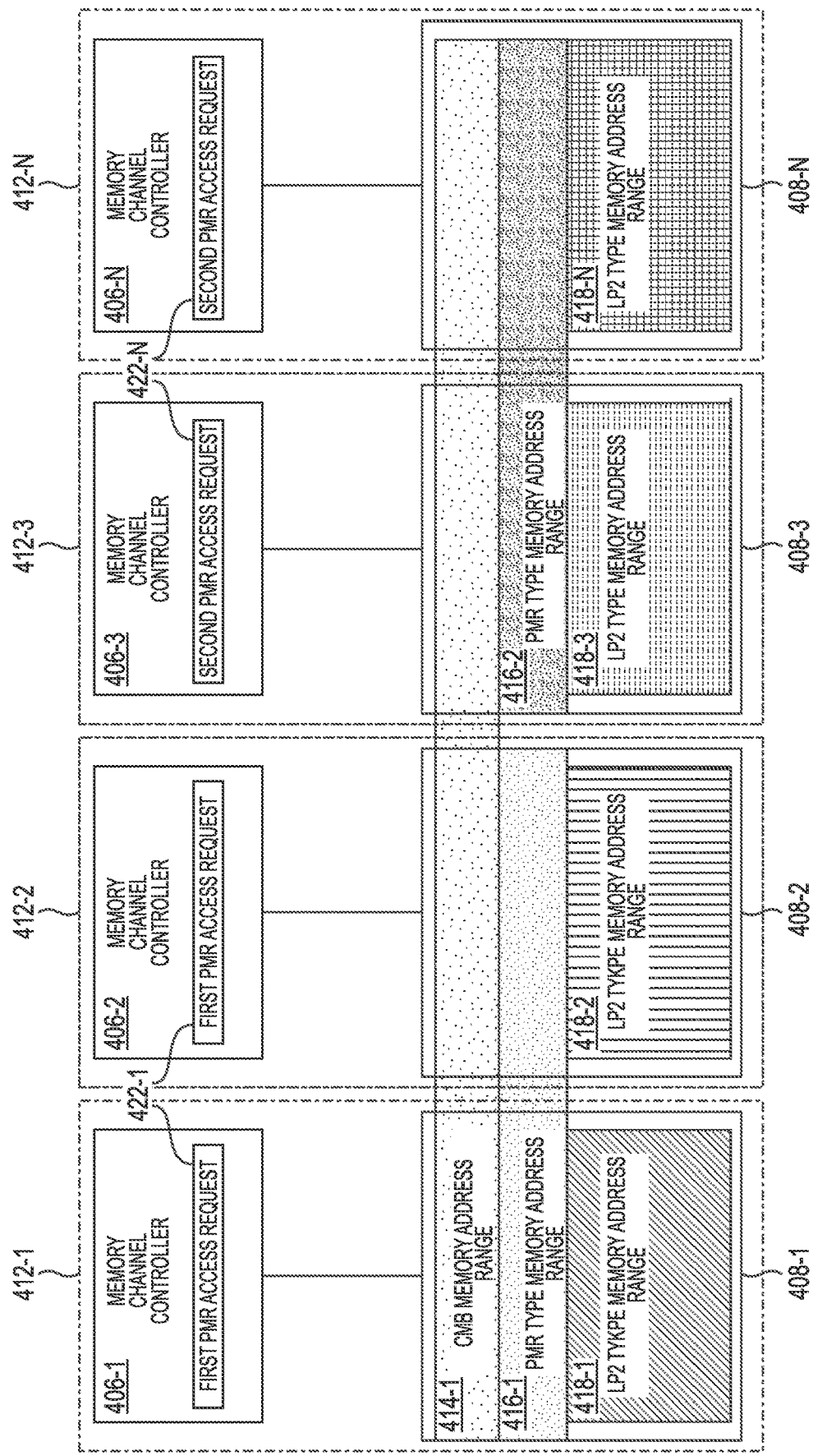
FIG. 4 is a block diagram of executing a plurality of PMR access requests utilizing a plurality of memory channels within a memory system in accordance with embodiments of the present disclosure.

FIG. 4 is a block diagram of executing a plurality of PMR access requests 422-1 . . . 422-N utilizing a plurality of memory channels 412-1 . . . 412-N within a memory system in accordance with embodiments of the present disclosure.

In FIG. 4 a memory manager or controller of the memory system may receive a plurality of access requests 422-1 . . . 422-N from a communicatively coupled host. The memory manager may determine a data type associated with each of the plurality of access requests 422-1 . . . 422-N. That is, the memory manager may determine a type of data being requested by each access request. In the example illustrated in FIG. 4, the memory manager may determine that the plurality of access requests is a plurality of PMR access requests 422-1 . . . 422-N. A PMR access request may be executed utilizing one of two sixteen-bit wide memory channels (e.g., made up of the cooperative operation of two eight-bit-wide memory channels).

The memory manager may queue the plurality of PMR access requests 422-1 . . . 422-N for execution by the plurality of memory channels 412-1 . . . 412-N of the memory system. The PMR type memory address ranges 416-1 . . . 416-2 may be accessible as two separate sets of memory channels. The first set may include the first memory channel 412-1 and the second memory channel 412-2 while the second set may include the third memory channel 406-3 and the fourth memory channel 406-N. The memory manager may determine whether any of the plurality of PMR access requests 422-1 . . . 422-N are attempting to access PMR data entries in a same set of memory channels (e.g., both of the PMR access requests 422-1 and 422-N involve accessing data in a same set of the memory channels). If the memory manager determines that any of the plurality of PMR access requests 422-1 . . . 422-N are attempting to access PMR data entries in a same set of memory channels 412-1 . . . 412-N, then the memory manager may selectively delay the execution of some of one of the PMR access requests 422-1 . . . 422-N in order to eliminate any conflict. However, when the memory manager determines that neither of the PMR access requests 422-1 . . . 422-N are attempting to access PMR data entries in a same set of memory channels 412-1 . . . 412-N, the memory manager may queue each of the plurality of PMR access requests 422-1 . . . 422-N in a separate set of memory channels for a simultaneous execution of both of the PMR access requests 422-1 . . . 422-N in parallel during the same burst.

For example, the memory manager may cause the first memory channel controller 406-1 and the second memory channel controller 406-2 to cooperatively execute the first PMR access request 422-1 by accessing requested PMR data in PMR memory address range 416-1 in the first memory device 408-1 and in the second memory device 408-2.

The memory manager may cause the third memory channel controller 406-3 and the fourth memory channel controller 406-N to execute the second PMR access request 422-N by accessing requested PMR data in memory address range 416 in the third memory device 408-3 and in the fourth memory device 408-N simultaneous with the execution of the first PMR access request 422-1.

Although FIG. 3 and FIG. 4 illustrate examples of executions of a plurality of access requests of a same kind in the same burst, other embodiments are contemplated within the scope of this disclosure. For example, the memory manager may cause the simultaneous execution of access requests of different data types in the same burst. For example, the memory manager may cause the simultaneous execution of one or two L2P access requests with a PMR access request in the same burst.

Figure 5:
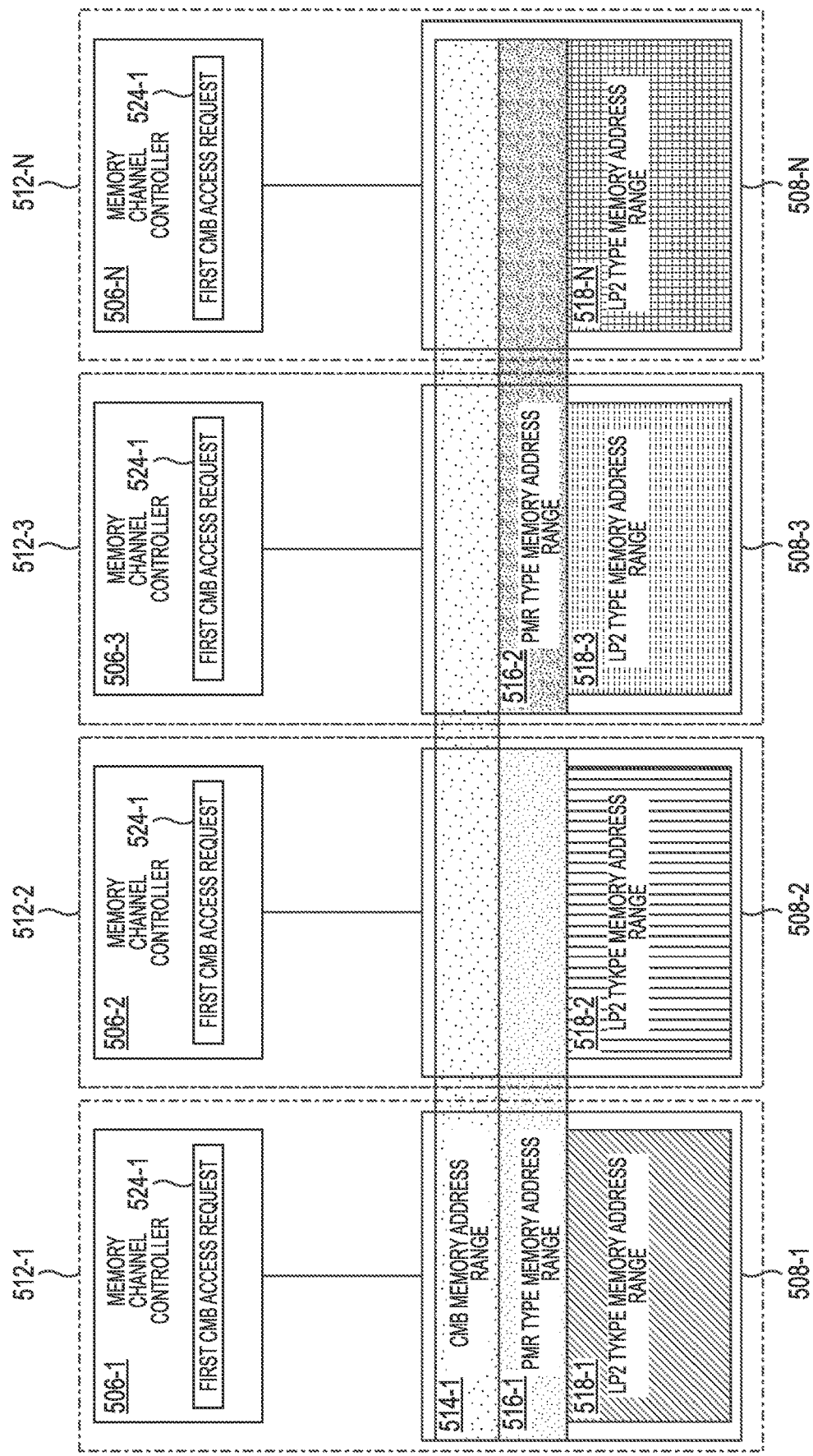
FIG. 5 is a block diagram of a CMB access request utilizing a plurality of memory channels within a memory system in accordance with embodiments of the present disclosure.

FIG. 5 is a block diagram of a CMB access request 524-1 utilizing a plurality of memory channels 512-1 . . . 512-N within a memory system in accordance with embodiments of the present disclosure.

In FIG. 5 a memory manager or controller of the memory system may receive an access request 524-1 from a communicatively coupled host. The memory manager may determine a data type associated with the access request 524-1. That is, the memory manager may determine a type of data being requested by the access request. In the example illustrated in FIG. 5, the memory manager may determine that the access request is a CMB 524-1 access request. A CMB access request may be executed utilizing one thirty-two-bit wide memory channel (e.g., made up of the cooperative operation of four eight-bit-wide memory channels).

The memory manager may queue the CMB access requests 524-1 for execution by the plurality of memory channels 512-1 . . . 512-N of the memory system. The CMB type memory address range 514-1 may be accessible as a single set of memory channels 512- . . . 512-N. The memory manager may queue the first CMB access request 524-1 for cooperative execution across the memory channels 512-1 . . . 512-N in parallel during the same burst.

For example, the memory manager may cause the first memory channel controller 506-1, the second memory channel controller 506-2, the third memory channel controller 506-3, and the fourth memory channel controller 506-N to cooperatively execute the first CMB access request 524-1 by accessing requested CMB data in memory address range 514-1 in the first memory device 508-1, CMB data in memory address range 514-1 in the second memory device 508-2, CMB data in memory address range 514-1 in the third memory device 508-3, and CMB data in memory address ranges 514-1 in the fourth memory device 508-4.

Other examples are contemplated wherein the memory manager may cause the first memory channel controller 506-1, the second memory channel controller 506-2, and the third memory channel controller 506-3 to cooperatively execute the first CMB access request 524-1 by accessing requested CMB data in memory address range 514-1 in the first memory device 508-1, CMB data in memory address range 514-1 in the second memory device 508-2, and CMB data in memory address ranges 514-1 in the third memory device 508-3. In such examples, an L2P access request may be executed simultaneously in the same burst utilizing the fourth memory channel 512-N left unutilized by the CMB access request.

Figure 6:
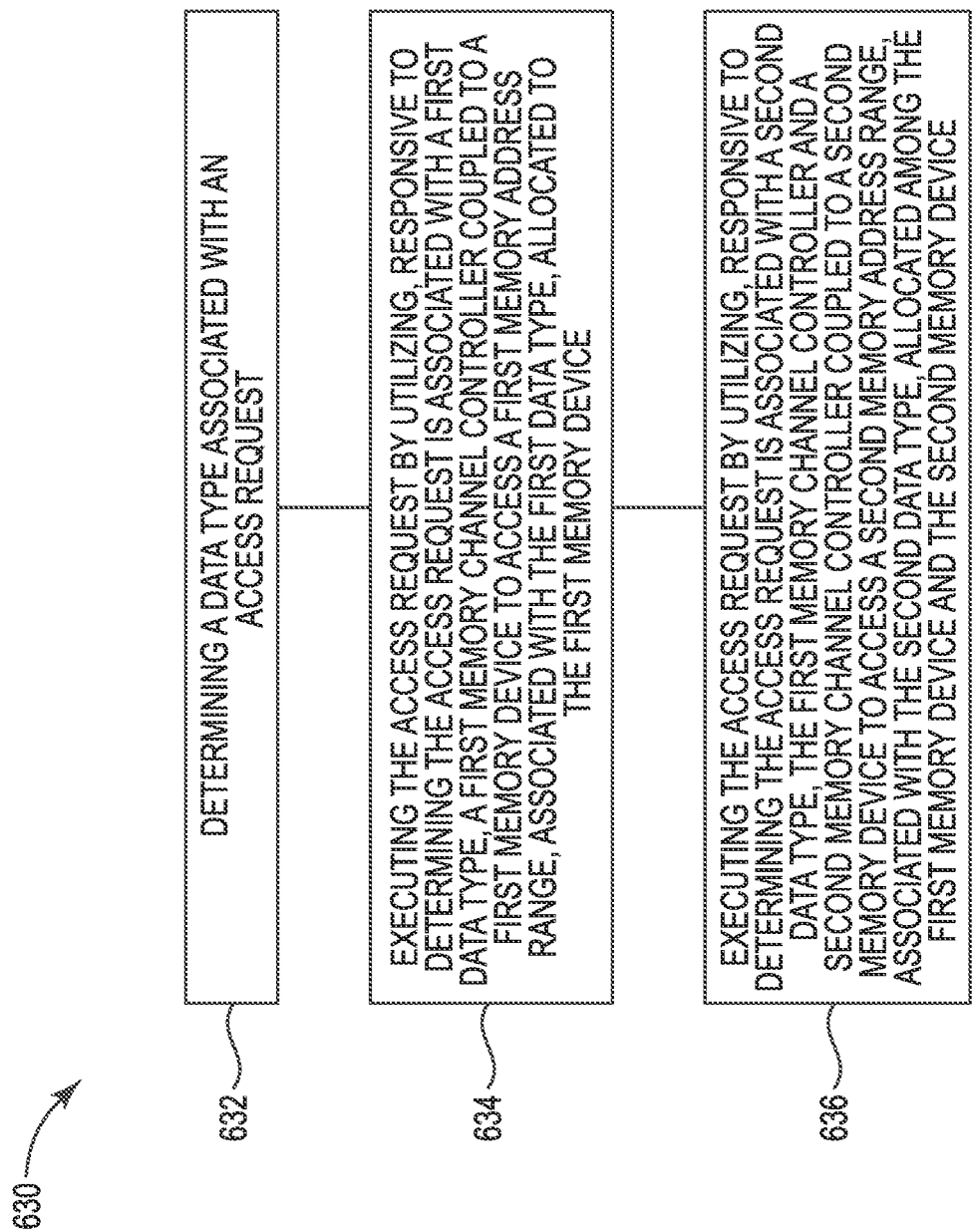
FIG. 6 is a block diagram of method for access request execution in accordance with embodiments of the present disclosure.

FIG. 6 is a block diagram of method 630 for access request execution in accordance with embodiments of the present disclosure. At 632, the method 630 includes determining a data type associated with an access request. For example, an access request may be received from a host across a host interface of a memory system. The memory system may include DRAM memory devices incorporated on an integrated circuit of a computing device.

The access request may include a request to access data values stored on specific memory devices. The access request may specify the data values it is requesting to access by identifying memory address ranges. As described above, the data type associated with an access request may be determined from the access request. For example, the type of data associated with the access request may be determined based on a size of a burst associated with an execution of the access request. For example, a short access request may include a relatively small data transmission capacity requirement to execute during a burst, an intermediate access request may include a relatively moderate data transmission capacity requirement to execute during the burst, and a long access request may include a relatively large data transmission capacity requirement to execute during the burst. The short access requests may be associated with a first data type, the intermediate access requests with a second data type, and the long access requests with a third data type.

The first data type may include L2P table data type executable utilizing a single 4-bit wide memory channel during the burst. The second data type may include PMR data type executable utilizing a pair of single 4-bit wide memory channels operating as a single 8-bit wide memory channel during the burst. The third data type may include CMB data type executable utilizing four single 4-bit wide memory channels operating as a single 32-bit wide memory channel during the burst.

The access request may be queued for execution. The access request may be placed into a position in an execution queue selected based on a priority assigned to a client issuing the access request. Additionally, the access request may be placed into a position in an execution queue selected based on the memory address range specified in the access request.

At 634, the method 630 may include executing the access request. For example, responsive to determining the access request is associated with a first data type the access request may be executed utilizing a first memory channel controller. The first memory channel controller may be coupled to a first memory device. The first memory channel controller may execute the access request by accessing a first memory address range. The first memory address range may be a range of memory addresses allocated to the first memory device. The first memory address range may be associated with the first data type.

At 636, the method 630 may include executing the access request in an alternative manner. For example, responsive to determining the access request is associated with a second data type, the access request may be executed utilizing the first memory channel controller and a second memory channel controller. The second memory channel controller may be coupled to a second memory device. The second memory channel device may execute the access request by accessing a second memory address range. The second memory address range may be allocated among the first memory device and the second memory device. The second memory address range may be associated with the second data type.

Alternatively, the access request may be utilized, responsive to determining that the access request is associated with a third data type, the first memory channel controller, the second memory channel controller, and a third memory channel controller coupled to a third memory channel device. The first, second, and third memory controllers may be utilized to access a second memory address range, associated with the third data type, allocated among the first memory device, the second memory device, and the third memory device Additionally, another access request may be executed in parallel with the above-described access request. For example, the access request may be executed as a first portion of a burst and the another access request may be executed as a second portion of the burst. However, the access request may be queued to be executed after another access request responsive to a determination that an address range of the access request and an address range of the another access request are both allocated to the first memory device.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   determining a data type associated with an access request;
   determining whether the access request is associated with a first data type or a second data type based on a size of a burst associated with execution of the access request;
   executing the access request by utilizing, responsive to determining the access request is associated with the first data type, a first memory channel controller coupled to a first memory device to access a first portion of a first memory address range, associated with the first data type, allocated to the first memory device; and
   executing the access request by utilizing, responsive to determining the access request is associated with the second data type, the first memory channel controller and a second memory channel controller coupled to a second memory device to access a second memory address range, associated with the second data type, allocated among the first memory device and the second memory device.

2. The method of claim 1, the method further comprising:
   executing the access request by utilizing, responsive to determining that the access request is associated with a third data type, the first memory channel controller, the second memory channel controller, and a third memory channel controller coupled to a third memory device to access a second memory address range, associated with the third data type, allocated among the first memory device, the second memory device, and the third memory device.

3. The method of claim 1, wherein the access request is a first access request, the method further comprising:
   executing a second access request in parallel with the first access request, wherein the first access request is executed as a first portion of a burst and the second access request is executed as a second portion of the burst.

4. The method of claim 1, the method further comprising: queueing an execution of the access request based on a priority assigned to a client issuing the access request.

5. The method of claim 1, the method further comprising: queueing an execution of the access request based on an address range specified in the access request.

6. The method of claim 5, wherein the access request is a first access request, the method further comprising:
queueing an execution of the first access request to be executed after a second access request responsive to a determination that an address range of the first access request and an address range of the second access request are both allocated to the first memory device.

7. An apparatus, comprising:
a first memory controller coupled to a first memory device, wherein a first memory address range, reserved for a portion of a first data type, is allocated to the first memory device;
a second memory controller coupled to a second memory device, wherein a second memory address range, reserved for a portion of a second data type, is allocated among the first memory device and the second memory device; and
a memory manager configured to:
determine a data type associated with a first access request;
determine a data type associated with a second access request;
utilize the first memory controller to execute the first access request and utilize the second memory controller to execute the second access request in parallel, responsive to a determination that the first access request is associated with the first data type and responsive to a determination that the second access request is not directed to the first memory device; and
utilize the first memory controller and the second memory controller to execute the first access request responsive to a determination that the first access request is associated with the second data type.

8. The apparatus of claim 7, further comprising:
a third memory controller coupled to a third memory device, wherein a third memory address range, reserved for a portion of a third data type, is allocated among the first memory device, the second memory device, and the third memory device.

9. The apparatus of claim 8, wherein the memory manager is configured to:
utilize the first memory controller, the second memory controller, and the third memory controller to execute the first access request responsive to a determination that the first access request is associated with the third data type.

10. The apparatus of claim 8, wherein the third data type is a controller memory buffer (CMB) access request.

11. The apparatus of claim 10, wherein the CMB access request is to be executed alone in a burst via one thirty-two-bit wide memory channel.

12. The apparatus of claim 7, wherein the first data type is a logical to physical (L2P) access request.

13. The apparatus of claim 12, wherein the L2P access request is to be simultaneously executed in parallel with three other L2P access requests in a single burst, each L2P access request utilizing one of four eight-bit wide memory channels.

14. The apparatus of claim 7, wherein the second data type is a persistent memory region (PMR) access request.

15. The apparatus of claim 14, wherein the PMR access request is to be simultaneously executed in parallel with one other PMR access request in a single burst, each PMR access request utilizing one of two sixteen-bit wide memory channels.

16. A system, comprising:
a first memory controller coupled to a first memory device, wherein a first memory address range, reserved for a first portion of a first data type, is allocated to the first memory device;
a second memory controller coupled to a second memory device, wherein:
a second memory address range, reserved for a first portion of a second data type, is allocated among the first memory device and the second memory device, and
a third memory address range, reserved for a second portion of the first data type, is allocated to the second memory device; and
a memory manager configured to:
determine a memory address range associated with a first access request;
determine a memory address range associated with a second access request;
utilize the first memory controller and the second memory controller to execute the first access request responsive to a determination that the first access request is associated with the second memory address range;
utilize the first memory controller to execute the first access request responsive to a determination that the first access request is associated with the first memory address range; and
utilize the second memory controller to execute the second access request in parallel with an execution of the first access request utilizing the first memory controller, responsive to a determination that the first access request is associated with the first memory address range and a determination that the second access request is associated with the third memory address range.

17. The system of claim 16, further comprising:
a third memory controller coupled to a third memory device; and
a fourth memory controller coupled to a fourth memory device, wherein a fourth memory address range, reserved for a third data type, is allocated among the first memory device, the second memory device, the third memory device, and the fourth memory device.

18. The system of claim 17, wherein:
a fifth memory address range, reserved for a second portion of the second data type, is allocated among the third memory device and the fourth memory device,
a sixth memory address range, reserved for a third portion of the first data type, is allocated to the third memory device, and
a seventh memory address range, reserved for a fourth portion of the first data type, is allocated to the fourth memory device.

19. The system of claim 16, the memory manager is configured to assign a higher execution priority in the access request execution queue to controller memory buffer (CMB)

access requests and persistent memory region (PMR) accesses requests than an execution priority assigned to a logical to physical (L2P) accesses requests.

* * * * *